Figure 1:
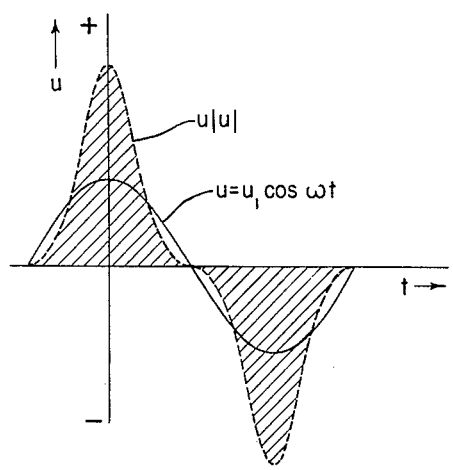

Oct. 16, 1956   P. J. WESTERVELT ET AL   2,766,881
ACOUSTIC SEPARATORY METHODS AND APPARATUS
Filed March 26, 1951   3 Sheets-Sheet 1

*INVENTORS*
PETER J. WESTERVELT
PETER W. SIECK
BY
ATTORNEYS

Oct. 16, 1956  P. J. WESTERVELT ET AL  2,766,881
ACOUSTIC SEPARATORY METHODS AND APPARATUS
Filed March 26, 1951  3 Sheets-Sheet 2

*INVENTORS*
PETER J. WESTERVELT
PETER W. SIECK
BY
*Richard R. Hildreth*
*and Melvin R. Jenney*
ATTORNEYS Oct. 16, 1956  P. J. WESTERVELT ET AL  2,766,881
ACOUSTIC SEPARATORY METHODS AND APPARATUS
Filed March 26, 1951  3 Sheets-Sheet 3
Fig. 8
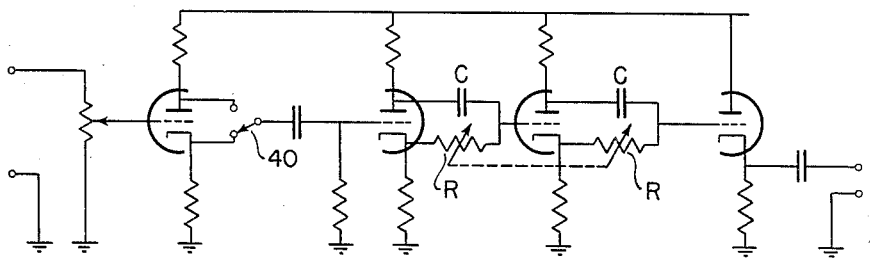
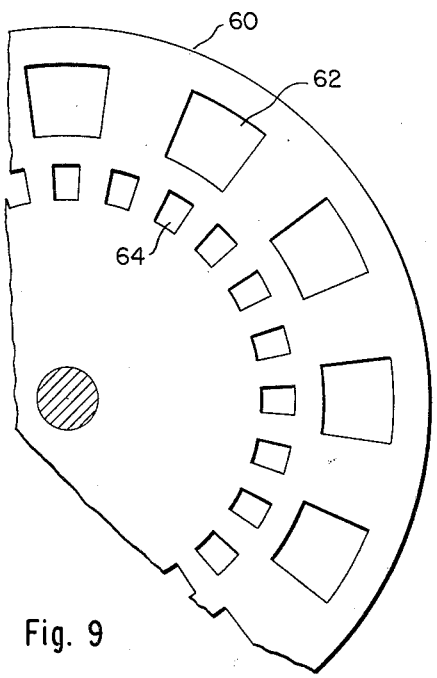
Fig. 9
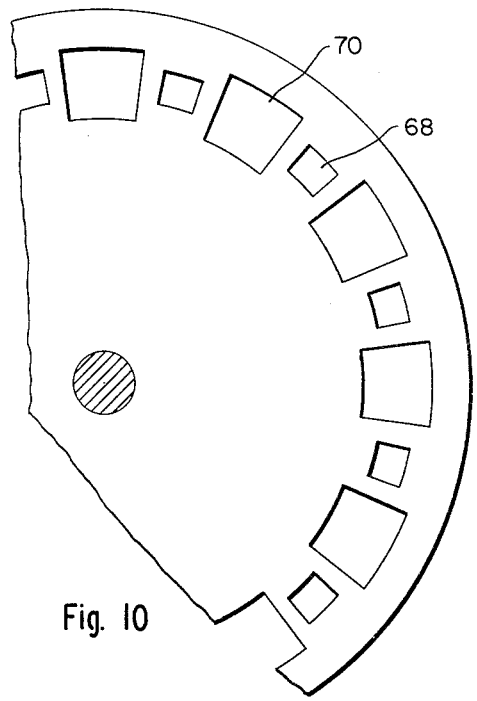
Fig. 10
INVENTORS
PETER J. WESTERVELT
PETER W. SIECK
BY Richard R. Hildreth
and Melvin R. Jenney
ATTORNEYS

United States Patent Office 2,766,881
Patented Oct. 16, 1956

2,766,881

ACOUSTIC SEPARATORY METHODS AND APPARATUS

Peter J. Westervelt, Providence, R. I., and Peter W. Sieck, Winnetka, Ill., assignors to Research Corporation, New York, N. Y., a corporation of New York Application March 26, 1951, Serial No. 217,552

7 Claims. (Cl. 209—138)

This invention relates to methods of treating dispersions of discrete particles in fluid mediums and particularly to methods which are based on the effect of sound waves or oscillatory motions of the medium on such particles.

The use of sound waves to agglomerate aerosols has been the subject of considerable interest in recent times due to the importance of recovering materials that pass off from a process as smoke or vapor, and to the increasing effort to prevent pollution of the atmosphere with industrial wastes. However, the interaction of a sound wave with a dispersion of small particles is a complex theoretical problem and the mechanism of the agglomeration process has not been well understood. As a result, practical efforts to cause agglomeration by acoustical techniques have met with only limited success.

The difficulties presented by dispersions of small particles are not limited to the process of agglomeration. Thus, the problem of separating small particles from a medium containing a suspension of particles according to size or density presents similar difficulties. Ordinary screening and sieving techniques are usually inapplicable to particles having a diameter less than about 75 microns. It has been shown that small particles may be suspended in an intense sound field. If such a sound field is propagated vertically in an enclosed chamber the larger particles will be suspended nearer to the sound source where the intensity of the sound is greatest while the smaller particles will be suspended at a higher level where the sound field is less intense. However, the use of this technique as a means of separating small particles requires large amounts of power and has found relatively limited commercial application. As in the case of agglomeration lack of understanding of the mechanism of this interaction has handicapped efforts to provide proper design of apparatus to produce optimum interaction effects.

Therefore, in view of the above limitations on existing techniques, one of the objects of the present invention is to provide a more adequate understanding of the interaction of sound waves with small particles dispersed in a fluid medium so that more suitable design criteria for the construction of apparatus intended to produce interaction effects may be formulated.

When a particle moves with respect to a fluid medium, viscous drag forces act on the particle in a direction opposite to the direction of the motion of the particle through the medium. For small steady velocities this force, given by Stokes Law, is proportional to the velocity of the particle with respect to the medium. At higher steady velocities the force on a particle contains a substantially large term proportional to the square of the velocity in addition to the linear term. Thus, the interaction of a particle with a moving medium is non-linear with respect to the velocity of the medium.

When a particle interacts with a medium undergoing a periodic oscillatory motion the instantaneous force on the particle is proportional in part to the first power of the instantaneous velocity and in part to the square of the instantaneous velocity of the medium with respect to the particle. Expressed more precisely, the force is proportional to the product of the absolute magnitude of the velocity of the medium with respect to the particle and the vector velocity of the medium with respect to the particle, in addition to a linear term proportional to the velocity. This product, for the sake of simplicity, will be called the velocity product. This relation is substantially correct as long as the displacement of the particle with respect to the medium in a given period of the oscillatory motion, that is, the particle displacement amplitude, is larger than the diameter of the particle. If the integral of the instantaneous force on a particle in a given period of the oscillatory motion is equal to zero, there is no net steady force acting on the particle. For the alternating component of an oscillatory motion the linear term always averages to zero over a period so that the integral of the instantaneous force over a period is equal to the integral of the velocity product over a period. Therefore, the condition that there be no net steady force on a particle due to the alternating component of the velocity waveform requires that the integral of the velocity product be zero. That is $$\int_{t}^{t+2\pi} u|u|dt = 0$$

where $u$ is the instantaneous velocity of the medium with respect to the particle, the symbol $||$ denotes absolute magnitude, and the integration is taken over one period.

In the usual techniques employed for treating dispersions of particles by acoustical techniques, a sound generator produces an intense sound field in the medium in which the particles are dispersed. The sound output produced by the generator is ordinarily composed essentially of a single fundamental frequency which can be represented by a sinusoidal waveform. However, the velocity product integral of a sinusoidal waveform is equal to zero, hence, in a medium having that type of velocity waveform no substantial net steady force on a particle can be produced. Such small forces as do exist are now believed to be the result of the incidental occurrence of higher order harmonics in the output of the sound source.

In order that appreciable forces may be made available for the treatment of particle dispersions, the present invention contemplates the generation of sound waves of special character and configuration, resulting in a velocity waveform of the medium with respect to a particle such that the velocity product integral is substantially different from zero, so as to give rise to a substantial net steady force on the particle by reason of the non-linear interaction of the particle with the medium. Depending on the shape of the velocity waveform of the medium, the magnitude of this force may be as much as ten or twelve orders of magnitude larger than the forces exerted on a particle due to acoustic radiation pressure. Therefore, according to the principles contemplated by the present invention, it is possible to generate and control net steady forces on small particles by specifically generating and controlling oscillatory motions or sound waves in a fluid medium containing a dispersion of small particles in a manner dictated by the above theoretical considerations.

There are numerous forms of apparatus which, when suitably energized, will generate in a fluid medium the appropriate velocity waveform contemplated by the present invention. The particular apparatus used in a given situation will depend on the nature of the fluid medium, the frequency of the oscillatory motion, the degree of control of the net steady force that is desired, and the power required to carry out the treatment.

In one form of apparatus for the treatment of a dispersion of particles to produce agglomeration an aerosol is introduced into a hollow cylindrical treating chamber and a sound generator propagates sound energy through the chamber from the lower end of the chamber according to techniques presently in use. However, the sound generator is arranged or actuated in such a way as to produce an asymmetrical velocity waveform having a velocity product integral substantially different from zero. For example, a loudspeaker, employed as a sound generator, when driven by a voltage having an appropriate waveform and coupled to a fluid medium containing a dispersion of particles, will produce the type of oscillatory motion in the fluid medium in which net steady forces will be exerted on the particles in the medium. Well known electronic techniques are employed to drive the loudspeaker with a voltage having an appropriate waveform.

The net steady force produced on a particle in the aerosol for a given asymmetrical waveform is proportional to the cross-sectional area of the particle. Thus, due to the variation in size of these small particles, differential forces will be produced in the dispersion which tend to increase the collision probability between particles. By increasing the number of collisions between particles, agglomeration is enhanced.

Instead of bringing about agglomeration of the suspended particles, the method may be utilized to achieve selective separation of particles according to size or weight. By appropriate choice of waveform and frequency, the particles may be caused to distribute in space so that it becomes possible to separate out the particles. Heavy particles would be suspended near the sound source where the sound field is most intense while lighter particles would be suspended at a higher level in the sound chamber where the sound intensity is less intense.

It is not necessary that the medium be air or other gaseous substance. The invention is applicable to dispersions of particles in liquid mediums. In this case, the appropriate oscillatory motion may be generated in any suitable manner. For example, as it is likely that the frequencies used will be lower than those used in gaseous mediums, it may be found preferable to generate the appropriate oscillatory motion by actuating a mechanical piston or diaphragm. The piston or diaphragm may be driven by any mechanical arrangement such as a shaft and cam so that the velocity waveform of the diaphragm or piston has the appropriate type of asymmetrical waveform having a velocity product integral substantially different from zero.

In general, any source of oscillatory motion may be employed provided that the apparatus is capable of operating at the frequencies necessary in the present invention and at a power level high enough to effect the particular treatment contemplated. More important, however, than the source of the oscillations, or the apparatus associated with sound chamber, is the particular manner in which the source is actuated and the apparatus needed to produce and control a particular type of actuation. This actuation must be such that the source will propagate an oscillatory motion in the fluid medium which has a velocity waveform such that its velocity product integral is substantially different from zero. It is further desired for certain treatments that the velocity waveform be controlled so that the magnitude and direction of forces exerted on small particles in the medium be controlled.

Figure 2:
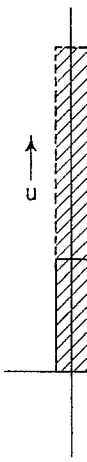
Figure 3:
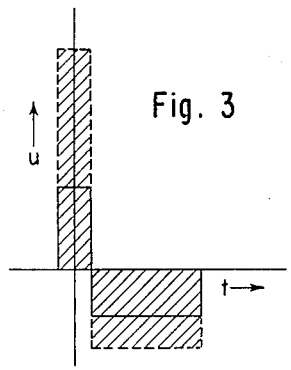
Figure 4:
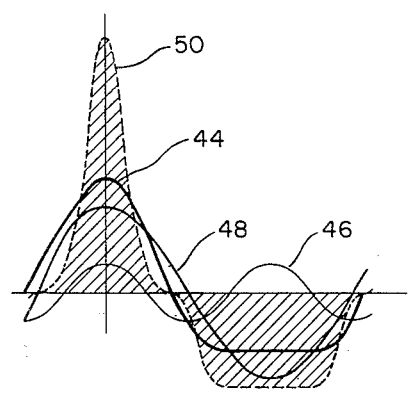
Figure 5:
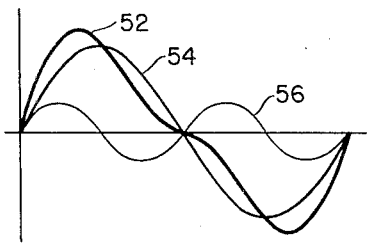
Figure 6:
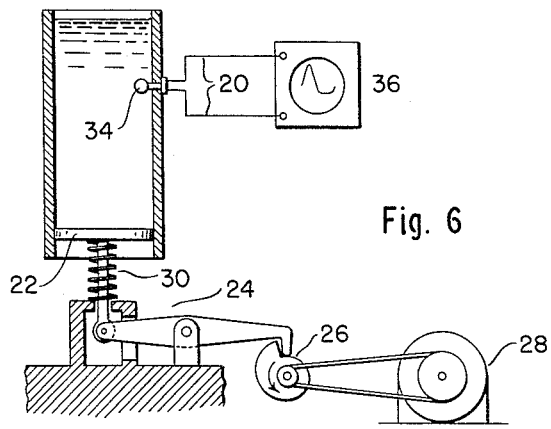
Figure 7:
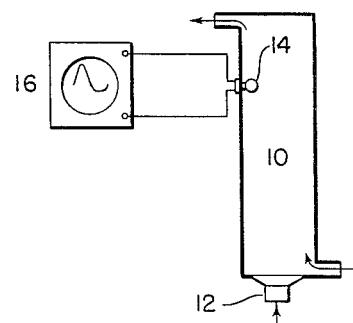
Figure 7:
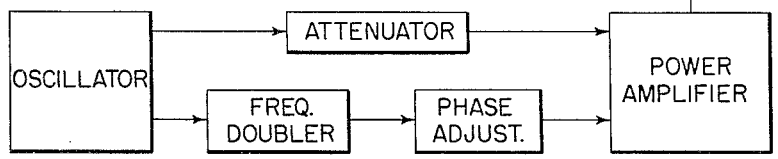

In the discussion which follows reference is made to the following figures, in which Fig. 1 shows a sinusoidal waveform and a curve associated with it; Figs. 2 and 3 show various rectangular waveforms; Fig. 4 shows a representative peaked waveform and its components; Fig. 5 shows a somewhat different waveform and its components; Fig. 6 shows apparatus for liquid treatments; Fig. 7 shows a form of acoustical treating apparatus; Fig. 8 is a schematic diagram of a phase shifting device; Figs. 9 and 10 show portions of acoustic siren disks for generating appropriate waveforms.

In considering the nature of the waveform desired for carrying out the method of the present invention, it will be helpful to examine a plot of the alternating component of the velocity of the medium with respect to a particle in the medium, as such diagram furnishes essential information regarding the forces exerted on the particle by the medium. A component of steady velocity of the medium with respect to the enclosure or sound chamber, although it may move particles along with the medium with respect to some fixed point, does not contribute to the forces described above, which arise wholly from the alternating or oscillatory component of the velocity of the medium with respect to the particle. Likewise any steady velocity component of the particle with respect to the medium is not to be considered in examining the above forces. Therefore, in a plot of the alternating component of the velocity of the medium with respect to a particle versus time, the area within the curve on one side of the axis is equal to the area within the curve on the opposite side of the axis in order that there be no net steady velocity represented in the plot.

The net steady force on a particle due to the oscillatory motion of the medium is proportional to the velocity product integral as described above. The velocity product of a given velocity waveform may be plotted by squaring the ordinate of each point on the velocity waveform curve, keeping the algebraic sign of the squared ordinate the same as the ordinate. Thus the plot of the velocity product shows a waveform which has the same period and the same sense of algebraic sign as the plot of the velocity waveform. The velocity product integral for a given period may be found by adding the total area within the velocity product curve where areas above the axis are taken as positive and areas below the axis are taken as negative. This procedure is simply a convenient way of evaluating graphically the velocity product integral:

$$\int_{t}^{t+2\pi} u|u|dt$$

Fig. 1 shows a velocity waveform having the form of a pure sine wave. The sine wave, which represents the alternating component of the velocity of the medium with respect to the particle, is represented by the solid black curve. The velocity product of the sine wave is shown by the dotted line. It can be seen from the diagram that the area within the curve above the axis is just equal to the area within the curve below the axis, so that the velocity product integral is zero. This means that there is no net steady force on the particle resulting from oscillatory motion of the medium.

Fig. 2 shows a rectangular velocity waveform, again represented in solid black outline, and the velocity product associated with this waveform. It is immediately evident from the figure that although areas within the corresponding parts of the velocity waveform above and below the axis are equal, the corresponding areas within the velocity product curve are not equal. The area within the portion of the velocity product curve above the axis is considerably greater than the area of the same curve below the axis. This means that the velocity product integral is not zero, but has a substantial positive value, with the result that a corresponding net steady force as described above will be exerted on the particle. This force is effective to accelerate the particle in the medium giving the particle a net velocity component with respect to the medium. The effect of superimposing this net steady velocity on the particle with respect to the medium is to shift the velocity waveform downward by the amount of the steady velocity component. Equilibrium is established when the particle reaches a net steady velocity such that the velocity product integral of the shifted velocity waveform is equal to zero, as shown in Fig. 3. In that figure the area within the upper portion of the velocity waveform is no longer as large as the area within the lower portion of the velocity waveform, showing that the net steady velocity of the particle is the result of the force acting on the particle. In other words, in a medium having the velocity waveform of Fig. 2, a particle will be accelerated by reason of the net steady force exerted upon it until a net steady velocity component large enough to shift the waveform down as in Fig. 3 does exist.

Reference to Fig. 2 shows that the velocity product integral could be made larger by increasing the height of the positive peak of the velocity waveform. This would mean that the positive peak would have to be narrower in order to equal the area below the axis. This narrow high peak on the positive side of the axis would produce a very large increase in the velocity product for that portion of the cycle while the relatively small negative value of the velocity waveform would remain essentially unchanged.

Thus, from a theoretical point of view, the velocity waveform which produces the largest net force on a small particle is one which has a very high narrow peak during a short portion of the period on one side of the axis and a very low broad shape during a long portion of the period on the other side of the axis. This waveform may effectively be produced by superimposing a very sharp positive velocity pulse on a steady negative velocity of small magnitude. In practice it is difficult to generate such an oscillatory motion in a fluid medium. However, it is not necessary to approach this ideal waveform in order to produce substantially large forces of the type described. It is only necessary that, as an approximate indication, the average amplitude of the velocity waveform on one side of the axis be larger than the average amplitude on the opposite side of the axis. Since the areas within the respective portions of the velocity waveform lying above and below the axis are equal, due to the way they have been plotted, the portion of the waveform having a larger average amplitude must occupy a correspondingly smaller portion of the total period than that portion of the waveform on the opposite side of the axis having a smaller average amplitude.

An analysis of the waveform of Fig. 2 by the well-known Fourier method shows that such a waveform may be represented as the sum of a series of cosine terms if the center of the positive pulse lies on the ordinate at $t=0$. That is $$u = u_1 \sum_{n=1}^{\infty} f_n \cos nwt$$

where $u_1$ is the amplitude of the fundamental component and $f_n$ is the ratio of the amplitude of the $n^{th}$ harmonic component to the amplitude of the fundamental. Theoretically an infinite number of harmonic components are necessary to form the perfectly rectangular waveform shown in Fig. 2. However, depending on the height of the positive pulse or its width relative to one period, only a finite number of higher harmonic components need be present in substantial amplitude relative to the fundamental. As the height of the positive pulse grows larger the number of substantially large higher order harmonics becomes greater. It is also evident from the Fourier expression above that all of the components are in phase with each other which results from the fact that the origin of coordinates was placed in the center of the positive pulse. In effect, every harmonic component has a maximum value at the origin, thus producing a high peak about that point, while at other points the harmonic components are not all in phase and will partially cancel out. While it is impossible to generate physically a rectangular waveform having a very high narrow positive pulse, an analysis of this type of waveform furnishes valuable information regarding the waveforms that may be employed to produce net steady forces on particles.

With these considerations in view, the present invention contemplates the deliverate and calculated generation of higher harmonic components in addition to the fundamental component so as to produce a velocity waveform in the medium which has the type of asymmetry described above, so as to give rise to a velocity product integral substantially different from zero, and hence substantial net steady forces on particles in the medium.

One form of asymmetrical waveform of the type described above may be conveniently produced by adding a substantial amount of second harmonic component to the fundamental frequency. Fig. 4 shows such a waveform at 44, wherein the amplitude of the second harmonic component 46 is about 30% of the amplitude of the fundamental 48 and is in phase with the fundamental at $t=0$ so that the positive portions of both components add in that region. As in the preceding figures, only the alternating component of the waveform 44 is shown so that the area within the portion of the curve above the axis is equal to the area within the portion of the curve below the axis. Due to the fact that the amplitude of the portion of the velocity product curve 50 above the axis is substantially larger than the amplitude of the portion of the curve below the axis, the velocity product integral (represented by the difference between the shaded area above and below the axis) is substantially larger than zero. Hence, a net steady force proportional to the velocity product integral will be exerted on a particle in a medium oscillating in the manner shown in Fig. 4.

It is essential that the second harmonic component not be 90° out of phase with the fundamental according to the representation of the wave by cosine terms in order that net steady forces be produced on a particle. Fig. 5 shows a waveform 52 consisting of a fundamental component 54 and a second harmonic component 56 where the fundamental and second harmonic components are out of phase by 90°. This diagram shows that although the waveform deviates substantially from a pure cosine the waveform on one side of the axis is similar to the waveform on the other side of the axis so that the velocity product integral is equal to zero. As a result, there would be no net steady force on a particle in a medium oscillating according to the waveform shown in Fig. 5.

Thus, if the amplitude of the second harmonic component of the velocity waveform is zero, or negligibly small with respect to the fundamental component, or if the second harmonic is substantially 90° out of phase with respect to the fundamental component, no appreciable net steady force will be produced on particles in the medium. However, substantially large forces will be exerted on particles in the medium over large ranges of phase difference and amplitude of the second harmonic component relative to the fundamental component. For a maximum force on the particles the phase difference is preferably adjusted to zero although a phase difference anywhere in the range from $+45°$ to $-45°$ will produce substantially large forces. It will be noted that a reversal of the phase of the second harmonic component, for example, from zero to 180° has the effect of reversing the direction of the force on a particle. Referring to Fig. 4, a reversal of phase in effect will invert the velocity waveform and hence the large peak of the velocity product integral would occur on the negative side of the axis. A velocity waveform, such as that shown in Fig. 4, where the phase difference is zero, produces a force on the particle in the direction of the propagation of the wave, while a 180° phase difference reverses the direction of the force and gives rise to a force which tends to move the particle toward the sound source. It should also be noted that the specification of proper phase is relative to the manner in which the waveform is plotted with respect to the origin at $t=0$. In other words, if the large positive peak in the resultant waveform is to occur at the origin then the various components must all have a maximum value at that point, although they will be out of phase at other points along the waveform. The amplitude of the second harmonic may be in the range of 20% to 200% of the fundamental to produce substantially large forces.

Thus the present invention contemplates not only the generation of substantial net steady forces on small particles but also the control of the magnitude and sense (direction either positive or negative with respect to the direction of propagation of the wave motion in the medium) of these forces through the control of the relative phase difference and amplitude of the second harmonic with respect to the fundamental.

The magnitude of the forces may be further enhanced by the addition of higher harmonic components in the velocity waveform according to the analysis given above of an ideal rectangular velocity waveform. Although it is impractical to attempt to describe all the conditions that might be met by the addition of numerous higher harmonic components, it can be stated generally that the addition of any higher harmonic component that enhances the asymmetry of the velocity waveform so as to produce a larger velocity product integral will increase the net steady force on a particle. From the definition of the velocity product integral, and referring to Fig. 3, it will be seen that the addition of higher harmonic components in proper phase relation will tend to increase the amplitude of the positive peak while decreasing its width, and will at the same time decrease the amplitude of the negative peak while making it more broad and flat. The overall result will be an increase in the velocity product integral and hence the magnitude of the net steady force on a particle. Each of these higher harmonic components should preferably be in phase with the fundamental at the origin so that each component contributes to a maximum peak centered about the origin. At the same time it must be remembered that a very sharp narrow peak on the velocity waveform means at the same time very large accelerations and hence very large forces on the physical equipment which is employed to produce the oscillatory motion in the medium. This fact places a practical limitation on the sharpness of the velocity waveform peak that may be produced in a fluid medium.

The principles of the present invention are operative in standing waves as well as traveling waves. In an unattenuated traveling wave the relations of the harmonic components and hence the net steady forces are uniform throughout the sound field. In a standing wave the relations between the fundamental and higher harmonic components change as a function of position in the wave. Thus, in a standing wave, a particle will be acted upon by a net steady force which will be dependent on the phase and amplitude relations between the fundamental and higher harmonic components at that particular point in the sound field. Since the relative amplitude and phase of the various components vary as a function of position in a standing wave the net steady force produced on a particle will depend on its position in the wave. This property of a standing wave may be employed to great advantage in certain acoustical treatments since by proper specification of the wave pattern in a sound chamber the net steady force on particles may be arranged so as to move all the particles toward one or more limited regions in the sound field.

There are numerous forms of equipment that may be employed to produce the type of waveform which will give rise to net steady forces on small particles. It should be remembered in considering this equipment that the above waveforms pertain to the velocity of the medium and not the displacement of the medium, and that the velocity represented is the velocity of the medium with respect to particles in the medium. In general, however, if an oscillatory motion is imparted to the medium the velocity waveform of the medium with respect to a particle in the medium will have substantially the same form as the velocity waveform of the medium with respect to some fixed point, provided that the particle has sufficient inertia that it is not simply carried along with the oscillatory motion of the medium. The velocity waveform of the medium may be examined experimentally by inserting a sensitive microphone pickup in the medium and observing the voltage across the microphone on an oscilloscope. The characteristics of the physical system may then be adjusted to produce the optimum velocity waveform as shown by this technique. The physical equipment is designed to impart an oscillatory motion to the medium such that during one cycle the medium is given a large velocity in one direction for a short portion of the cycle and a smaller velocity in the opposite direction for a longer portion of the cycle.

For example, this may be accomplished, as described earlier, by driving a piston or diaphragm rapidly in one direction and drawing it back in the opposite direction more slowly, so as to have the type of peaked asymmetrical waveform described above. Fig. 6 illustrates one application of this technique in a liquid medium where it is desired to drive small particles dispersed in the liquid toward the surface. The liquid to be treated is placed in a cylindrical chamber 20. At the bottom of the chamber and forming the lower end of the chamber is a piston 22 actuated by the rod and arm assembly 24. A motor 28 rotates a cam 26 which contacts the end of the lever. The cam 26 is shaped so that as it rotates the right hand end of the lever arm is pushed upwards. This motion draws the piston 22 downward forcing it against the compression of a stiff spring 30. At the extreme downward position of the diaphragm the cam is shaped so as to release the force on the lever. The compression in the spring forces the piston suddenly upwards producing a sharp velocity pulse in the medium. The dynamics of such a mechanical system require that it be driven at a relatively low frequency, say from a fraction of one cycle to 100 cycles per second. A microphone pickup 34 is provided at a convenient place in the medium and the leads to the pickup are connected to an oscilloscope 36 so that the velocity waveform of the medium may be examined directly. It is obvious that many well-known mechanical techniques may be employed to actuate the piston so as to produce the appropriate velocity waveform.

One form of apparatus which may be employed in the treatment of aerosols according to the principles contemplated by the present invention is shown in Fig. 7. The aerosol is introduced into a cylindrical chamber 10. A loudspeaker or horn 12 is arranged to propagate sound energy into the chamber. The loadspeaker is actuated electrically so as to produce an asymmetrical waveform of the type described above.

The following is a convenient method of actuating the loudspeaker. An electronic oscillator or generator produces a sinusoidally varying voltage. A fraction of the output of the oscillator is fed into an ordinary electronic or crystal frequency doubler which produces a second harmonic component. Since the second harmonic component is not in the proper phase relation to the fundamental component it is necessary to provide some form of a phase shifting network.

If the equipment is to be employed in a treatment where it is preferred to produce a maximum net steady force on a particle a simple RC phase shifting network may be employed. The amount of phase shift necessary to produce the appropriate waveform will depend on the electrical characteristics of the other components of the system. However, the velocity waveform of the medium may be determined experimentally and the phase adjusted to produce the appropriate waveform. A microphone pickup 14 is provided in the chamber and the voltage developed by the microphone is observed by means of an oscilloscope 16 to determine the velocity waveform of the medium.

It may be preferable for many treatments to have available a means for continuously adjusting the phase of the second harmonic component. The circuit shown in Fig. 8 provides a means of continuous phase adjustment over a range of 180°. This circuit is essentially an electronic RC bridge which has the advantage that a change in the resistance arm R will produce a phase change without substantially affecting the amplitude of the second harmonic component. The resistance R is a 500,000 ohm dual linear pot and the plate and cathode resistances of the tubes are made equal to provide a balanced bridge. The capacitance of the condensers C determines the range of frequencies over which the circuit will operate effectively. For example, a capacitance of 0.01 microfarad provides an operative range of 70 to 200 C. P. S.; a capacitance of 0.005 microfarad provides a range of 150 to 400 C. P. S.; and a capacitance of 0.001 microfarads provides a range of 650 to 1000 C. P. S. The S. P. D. T. switch 40 provides a simple means of changing the phase by 180° or effectively reversing the phase. An attenuator is provided (see Fig. 7) so that the relative amplitudes of the fundamental and second harmonic components may be readily adjusted. The fundamental and second harmonic components are combined and amplified to the appropriate power level before being fed into the loudspeaker.

Sirens are commonly used in producing acoustical treatments in a gaseous medium since relatively large amounts of acoustical power may be generated in this manner. The general principle of such sirens is that a rotating disk 60 having a number of evenly spaced holes 62 around its perimeter may be employed to interrupt one or more jets of air so as to produce a pulsating air pressure, or, in effect, a sound wave. Although the waveform of a siren is by no means a pure sinusoidal waveform, it contains a substantial quantity of the fundamental frequency. A substantial proportion of the second harmonic component, and higher harmonics, if desired, may be generated by simply adding a second circle of holes 64 around the perimeter of the disk (see Fig. 9) where there are twice as many holes in this row to produce a sound wave of twice the frequency of the fundamental. The phase is adjusted for maximum asymmetry of the resultant waveform by arranging the second circle so that the center of alternate holes falls on a radius of the disk passing through the center of the larger holes. This corresponds to the condition above that a peak of the second harmonic component should coincide with a peak of the fundamental component in the same direction to produce a large peak at that point.

The same effect may be produced by combining the two sets of holes in a single row as is shown in Fig. 10, wherein the smaller holes 68 are located midway between relatively larger holes 70. It is also apparent that a third harmonic component could be added by further holes of appropriate number and spacing in a similar manner. The above techniques may be used in some cases to alter existing sirens as it may only involve the addition of new holes in the siren disk in the manner prescribed above. The proper shape of siren holes to give substantially a sinusoidal waveform from each hole is dictated by known acoustical techniques. What is prescribed as new here is the manner in which two or more sets of holes, corresponding to two or more frequency components, are properly arranged on a siren disk so that their combined effect is to produce a peaked asymmetrical velocity waveform of the medium.

The above described apparatus is representative of the type of equipment contemplated by the present invention and serves to illustrate how the principles of the present invention specify the design of apparatus utilized in treatments of dispersions of particles. However, the invention is by no means confined to the form of apparatus described above but rather lies in the specific manner in which a medium may be actuated so as to produce substantial net steady forces on particles dispersed in the medium.

The net steady forces produced on particles dispersed in a fluid medium may be used to enhance the processes of agglomeration of particles or aerosols or the separation of particles according to size or density as pointed out above. Use of this type of force in further treatments is within the scope of the present invention.

For example, an apparatus for treating particles dispersed in a liquid, such as that shown in simplified form by Fig. 6, may be adapted to enhance present methods of treating finely divided ore particles suspended in liquids. Thus, in the well-known flotation process, the liquid medium may be actuated to produce oscillatory motion of the liquid so as to give rise to net steady forces acting on ore particles suspended in the liquid. The resulting motion of the particles carries the particles to the surface of the liquid where they are removed and further treated according to well-known techniques.

Having fully described the features of the present invention, we claim:

1. Apparatus for treating a dispersion of discrete particles of varying size in a fluid medium to effect separation of the particles as a function of size by imparting flow to particles having less than a predetermined diameter which comprises a chamber, means for introducing the dispersion of solid particles into the chamber, a loudspeaker coupled to the fluid medium in the chamber, and means for actuating the loudspeaker with an oscillatory electric voltage having an asymmetrical alternating component wherein the voltage amplitude on one side of the axis is substantially larger than the voltage amplitude on the opposite side of the axis in a given period, and wherein the excursion of the loudspeaker is as large as the predetermined particle diameter.

2. Apparatus for treating a dispersion of discrete particles of varying size in a fluid medium to effect separation of the particles which comprises a chamber, means for introducing the dispersion of solid particles into the chamber, a loudspeaker coupled to the fluid medium in the chamber, means for determining the velocity waveform of the medium, means for actuating the loudspeaker with an oscillatory electric voltage wherein the voltage waveform is shaped asymmetrically to produce a velocity waveform having a velocity product integral substantially different from zero, and means for setting the amplitude of the loudspeaker excursion to correspond with the predetermined particle diameter, thereby to impart flow to particles having less than said predetermined diameter while leaving larger particles substantially unaffected.

3. Apparatus for treating a dispersion of discrete particles in a gaseous medium to effect separation of the particles as a function of size comprising a tank, means for introducing the dispersion of particles into the tank, means for removing treated gases from the tank, a movable member coupled to the gaseous medium in the tank, means for actuating the movable member to produce an oscillatory motion having an average displacement amplitude larger than a predetermined particle diameter and having an asymmetrical velocity waveform wherein the velocity product integral is substantially different from zero, thereby to impart a continuous flow to particles having less than said predetermined diameter while leaving larger particles substantially unaffected.

4. A method of treating a dispersion of particles in a gaseous medium to effect a displacement having a unidirectional component of motion, which comprises generating in said medium acoustic vibrations having an amplitude greater than the particle diameter and an asymmetric velocity waveform wherein the velocity product integral is substantially different from zero.

5. Apparatus for treating a dispersion of discrete particles in a fluid medium to effect relative motion between the particles as a function of size which comprises a chamber, means for introducing the dispersion of particles into the chamber, a transducer coupled to the fluid medium in the chamber, and means for actuating the transducer with an oscillatory electric voltage having an asymmetric waveform composed of fundamental and harmonic components of phase relationship such that the oscillatory voltage amplitude on one side of the waveform axis is substantially larger than the voltage amplitude on the opposite side of the axis.

6. A method of treating a dispersion of particles in a fluid medium to effect a displacement having a unidirectional component of motion, which comprises generating oscillations having an asymmetric waveform of greater amplitude on one side of the waveform axis than the amplitude on the other side of the axis, converting said oscillations into vibratory displacements, and coupling said displacements to the medium to generate vibratory displacements therein having an amplitude larger than a predetermined particle diameter.

7. A method of treating a dispersion of discrete particles in a fluid medium to effect relative motion between the particles by imparting to particles having less than a predetermined diameter a unidirectional flow component relative to particles larger than said diameter, which comprises generating in the medium a vibratory displacement having a displacement amplitude larger than said predetermined particle diameter, the waveform of said vibratory displacement having an asymmetric waveform composed of fundamental and harmonic components in phase relationship that produces a substantially greater displacement amplitude in one direction than in the other direction.

References Cited in the file of this patent

UNITED STATES PATENTS

| | | |
|---|---|---|
| 1,308,041 | Chubb | July 1, 1919 |
| 1,968,346 | Neiss | July 31, 1934 |
| 2,093,898 | Taplin | Sept. 21, 1937 |
| 2,109,395 | Markley | Feb. 22, 1938 |
| 2,174,125 | Ekman | Sept. 26, 1939 |
| 2,182,014 | Clark | Dec. 5, 1939 |
| 2,215,484 | St. Clair | Sept. 24, 1940 |
| 2,354,684 | Jones | Aug. 1, 1944 |
| 2,462,862 | Gunther | Mar. 1, 1949 |
| 2,505,446 | Walter | Apr. 25, 1950 |
| 2,535,679 | Horsley | Dec. 26, 1950 |
| 2,535,700 | Seavey | Dec. 26, 1950 |
| 2,592,703 | Jaffe | Apr. 15, 1952 |

FOREIGN PATENTS

| | | |
|---|---|---|
| 460,073 | Great Britain | Jan. 20, 1937 |